(12) United States Patent
Venkatachalam et al.

(10) Patent No.: US 8,077,657 B2
(45) Date of Patent: Dec. 13, 2011

(54) KEEP-ALIVE HANDLING IN A WIRELESS NETWORK

(75) Inventors: Muthaiah Venkatachalam, Beaverton, OR (US); Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1300 days.

(21) Appl. No.: 11/726,515

(22) Filed: Mar. 22, 2007

(65) Prior Publication Data

US 2008/0232288 A1     Sep. 25, 2008

Related U.S. Application Data

(60) Provisional application No. 60/918,878, filed on Mar. 19, 2007.

(51) Int. Cl.
*H04W 4/00* (2009.01)
(52) U.S. Cl. ............... 370/328; 370/392; 370/349
(58) Field of Classification Search ........... 370/392, 370/349; 709/204
See application file for complete search history.

(56) References Cited

U.S. PATENT DOCUMENTS

| 6,034,546 | A | 3/2000 | Jones et al. | |
|---|---|---|---|---|
| 7,599,370 | B1 * | 10/2009 | Leung et al. | 370/392 |
| 2007/0019610 | A1 * | 1/2007 | Backholm et al. | 370/349 |
| 2008/0059582 | A1 * | 3/2008 | Hartikainen et al. | 709/204 |

FOREIGN PATENT DOCUMENTS

WO   2006136660 A1   12/2006
WO   2008/115778 A1   9/2008

OTHER PUBLICATIONS

International Preliminary Report on Patentability and Written Opinion received for PCT Patent Application No. PCT/US2008/056968, mailed on Oct. 1, 2009, 6 pages.
S.Guha, et al., "NAT Behavioral Requirement for TCP", draft-itef-behave-tcp-04.txt, (Jan. 17, 2007), 26 pgs.
Zheng, R. et al., "On Demand Power Management for ad hoc Networks", Ad hoc Networks, vol. 3 (1), (2005), pp. 51-68.
International Search Report/Written Opinion for PCT Patent Application No. PCT/US2008/056968, mailed Aug. 18, 2008, 10 pgs.

* cited by examiner

*Primary Examiner* — Charles Shedrick
(74) *Attorney, Agent, or Firm* — Cool Patent, P.C.; Kenneth J. Cool; Joseph P. Curtin

(57) ABSTRACT

Briefly, in accordance with one or more embodiments, in wireless network, keep-alive type packets may be received from a remote application for a mobile station. A determination may be made whether the mobile station is in an idle mode. If the mobile station is in an idle mode, a determination may be made whether a port in a keep-alive type packet is recognized. If the port is recognized, an application server may respond to the keep-alive type packet on behalf of the mobile station so that the mobile station is not required to exit the idle mode to respond to the keep-alive type packets.

28 Claims, 7 Drawing Sheets

KEEP-ALIVE HANDLING IN A WIRELESS NETWORK

CROSS-REFERENCE TO RELATED APPLICATIONS

The present application claims the benefit of U.S. Provisional Application No. 60/918,878 filed Mar. 19, 2007.

BACKGROUND

In wireless broadband-type networks, such as a Worldwide Interoperability for Microwave Access (WiMAX)-type network or a Third Generation Partnership Project (3GPP)-type network, mobile stations may enter into an idle mode in order to conserve battery power. In idle mode, the MS does not perform active communications with the base station. While in an idle mode, a mobile station may periodically listen to communications from a base station to determine whether any data is available for the mobile station. If no data is available, the mobile station may remain in idle mode for increasingly longer periods of time until data is available. If data becomes available while the mobile station is in idle mode, a paging controller may page the mobile station to awaken from the idle mode so that data may be transferred to the mobile station. In some situations, the mobile station may be running a client program in which it may be connected with a remote application in the Internet, for example, an instant messaging (IM) type application or a Voice Over Internet Protocol (VOIP)-type application. In such arrangements, the remote application may send period keep-alive packets in response to which the mobile station may reply back with its current Internet Protocol (IP) address so that the remote application will know where to transmit any incoming data when communication with the mobile station is desired. Such keep-alive pings may, however, disrupt the idle mode of the mobile station and may consume wireless bandwidth resources for paging the MS as well as decrease the battery life of the mobile station if the mobile station is required to continuously transition back and for the between an idle mode and a connected mode merely to provide keep-alive responses to the remote application, especially in which, for example, a paging controller is used to page the mobile station to awaken the mobile station from idle mode to respond to every keep-alive ping.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
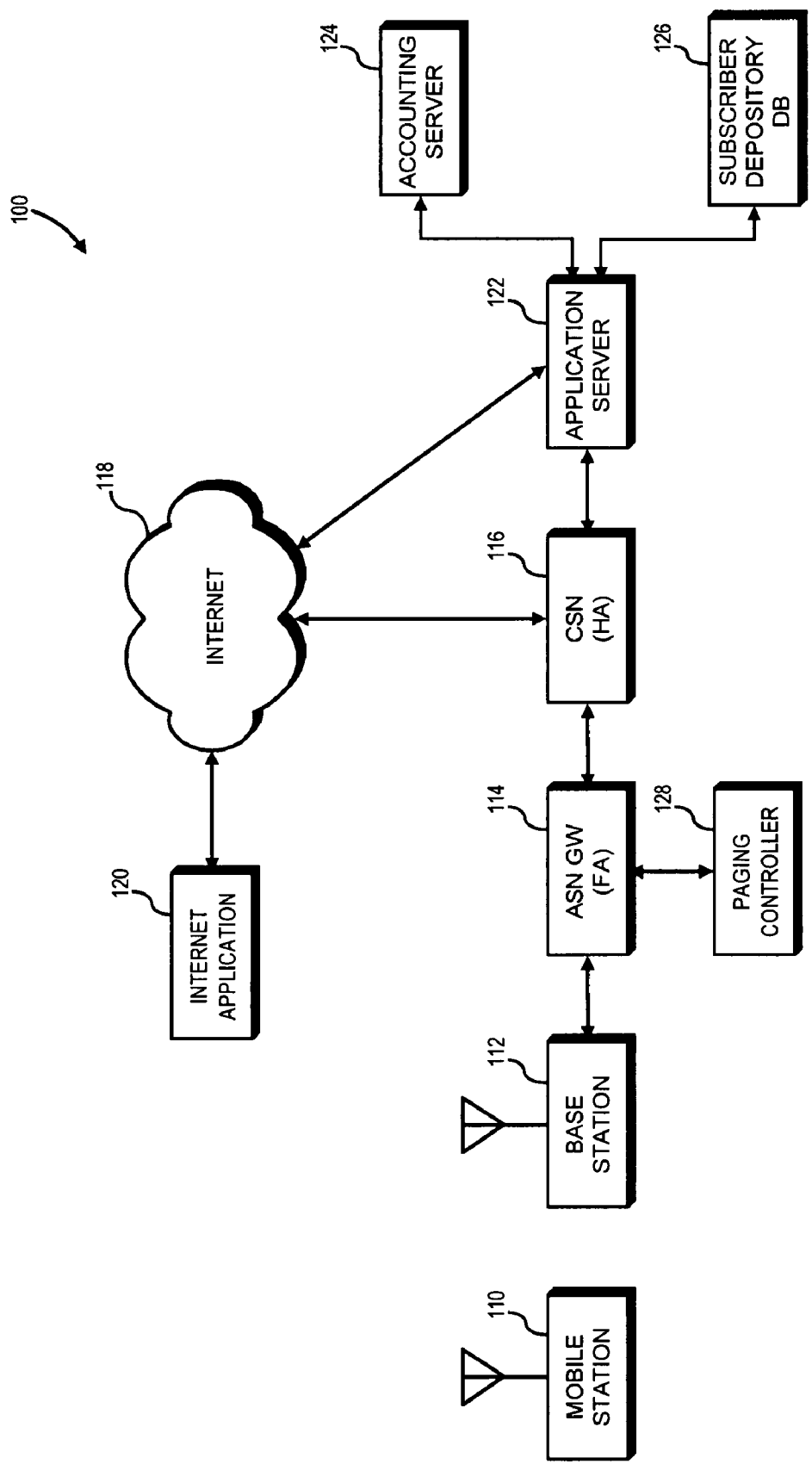
FIG. 1 is a diagram illustrating incorporation of an application server capable of keep-alive handling in a broadband wireless network or the like in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may lie practiced without these specific details. In other instances, well-known methods, procedures, components and/or circuits have not been described in detail.

Some portions of the detailed description that follows are presented in terms of processes, programs and/or symbolic representations of operations on data bits and/or binary digital signals within a computer memory, for example. These process descriptions and/or representations may include techniques used in the data processing arts to convey the arrangement of a computer system and/or other information handling system to operate according to such programs, processes, and/or symbolic representations of operations.

Unless specifically stated otherwise, as apparent from the following discussions, throughout the specification discussion utilizing terms, such as processing, computing, calculating, determining, and/or the like, refer to the action and/or processes of a computing platform, such as computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled may, however, also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

Referring now to FIG. 1, a diagram illustrating incorporation of an application server capable of keep-alive handling in a broadband wireless network or the like in accordance with one or more embodiments will be discussed. As shown in FIG. 1, a broadband wireless network 100 may be in compliance with an Institute of Electrical and Electronics Engineers (IEEE) 802.16e standard and/or an IEEE 802.16n-type standard, or the like, which may be referred to as a Worldwide Interoperability for Microwave Access (WiMAX) network. In such a network 100, mobile station 110 may be capable of wirelessly communicating with base station 112. Base station 112 may in turn be coupled to an access service network (ASN) gateway (GW) 114. When network 100 is not located within a home area of mobile station 110, for example, when mobile station 110 is roaming on another network, ASN GW 114 may function as a foreign agent (FA). In such an embodiment, ASN GW 114 may communicate with connectivity service network (CSN) 116 which may function as a home agent (HA) for mobile station 110. CSN 116 may be coupled to other networks and/or devices via the Internet 118, for example, so that mobile station 110 may be capable of communicating with such other networks and/or devices that are coupled to the Internet 118 by communicating over the Internet 118 via network 100. For example, mobile station 110 may communicate with a remote application such as Internet application 120 which may be, for example, a Voice Over Internet Protocol (VOIP)-type application in which a user of mobile station 110 may make telephone type phone calls via Internet 118 by communicating with Internet application 120 via network 100. Mobile station 110 may be capable of similarly communicating with other such Internet applications 120, for example, an instant messaging-type application, a session initiated protocol (SIP)-type application, an Internet multimedia subsystem (IMS-type network, a multimedia service control-type network, an online gaming-type application, an email-type application, and so on. These are, however, merely examples of the types of applications that may be implemented by Internet application 120, and the scope of the claimed subject matter is not limited in this respect.

As shown in FIG. 1, Internet application 120 may periodically ping the user of Internet application 120, in this example the user of mobile station 110, and/or an application running on mobile station 110 in conjunction with Internet application 120, for example, a client application for Internet application 120. Such a ping may be referred to as a keep-alive exchange that may function to maintain connectivity between mobile station 110 and Internet application 120. Such keep-alives may be sent from Internet application 120 to mobile station 110 to ensure that mobile station 110 is running the client application for Internet application 120, for example, so that Internet application 120 may know that mobile station 110 is capable of receiving messages and/or telephone calls when such a message and/or call is received and ready to be routed to mobile station 110. Furthermore, such a keep-alive may be utilized by Internet application 120 to determine the current Internet Protocol (IP) address of mobile station 110 so that Internet application may know where to route message and/or call packets to mobile station 110 when received, especially as mobile station 110 moves from one base station 114 to another base station 114, from one paging group to another paging group, and/or from one network 100 to another network 100. Thus, in one embodiment, when mobile station 110 is in communication with base station 112, that is when mobile station 110 is in a connected mode, Internet application 120 may send periodic keep-alives to mobile station 110, and mobile station 110 may send responses to the keep-alives to Internet application 120 when received by Internet application 120.

In the event mobile station 110 is not in a connected mode but is, for example, in an idle mode, for example, in order to conserve the power consumption of mobile station 110 in which mobile station 110 may be operating from battery power, mobile station 110 may not be immediately capable of responding to one or more keep-alives received from Internet application 120, unless it is paged by the network and the MS connects back to the network in response to the page. In such a situation, application server 122 may function as a proxy for mobile station 110 wherein application server 122 may be capable of responding to keep-alives on behalf of mobile station 110 and send a reply to keep-alives back to Internet application 120. In one or more embodiments, if application server 122 responds to keep-alives on behalf of mobile station 110, from the perspective of Internet application 120, it may appear that mobile station 110 replied to the keep-alive ping. In one or more embodiments, application server 122 may respond to keep-alives on behalf of mobile station 110 without requiring mobile station 110 to exit an idle mode, and/or without requiring paging controller 128 to page mobile station 110 to cause mobile station 110 to awake from an idle mode to respond to the keep-alive, however the scope of the claimed subject matter is not limited in this respect.

In one or more embodiments, application server 122 may be capable of communicating with accounting server 124 so that any charges associated with communication on behalf of mobile station 110 may be properly accounted for. Furthermore, in one or more embodiments, application server 122 may be capable of communicating with subscriber depository database 126 so that application server 122 may have knowledge of which mobile stations 110 may be communicating via network 100 so that application server 122 will know which mobile stations 110 that application server 122 may have to act on behalf of when one or more mobiles stations 110 are in an idle mode. In the event application server 122 receives and indication that one or more mobile stations 110 has data packets to be transferred to mobile station 110 when mobile station 110 is in an idle mode, for example, an incoming VOIP type call, application server 122 may be capable of communicating with paging controller 128 to cause mobile station 110 to exit an idle mode and enter a connected mode so that mobile station 110 may then receive the incoming data from Internet application 120. The scope of the claimed subject matter is, however, not limited in these respects. Control of how application server 122 tracks in network 100 when one or more mobile stations 110 are in an idle mode or a connected mode, and how keep-alives are handled by application server 122 when a mobile station 110 is in an idle mode, is discussed with respect to FIGS. 3, 4, and 5, below. Furthermore, while FIG. 1 shows an example in which network 100 is a broadband wireless network, application server 122 may similarly handle keep-alives or the like type of messaging on other types of networks, for example, Third Generation Partnership Project (3GPP)-type networks, for example, as shown in and described with respect to FIG. 2, and the scope of the claimed subject matter is not limited to any particular type of network.

Figure 2:
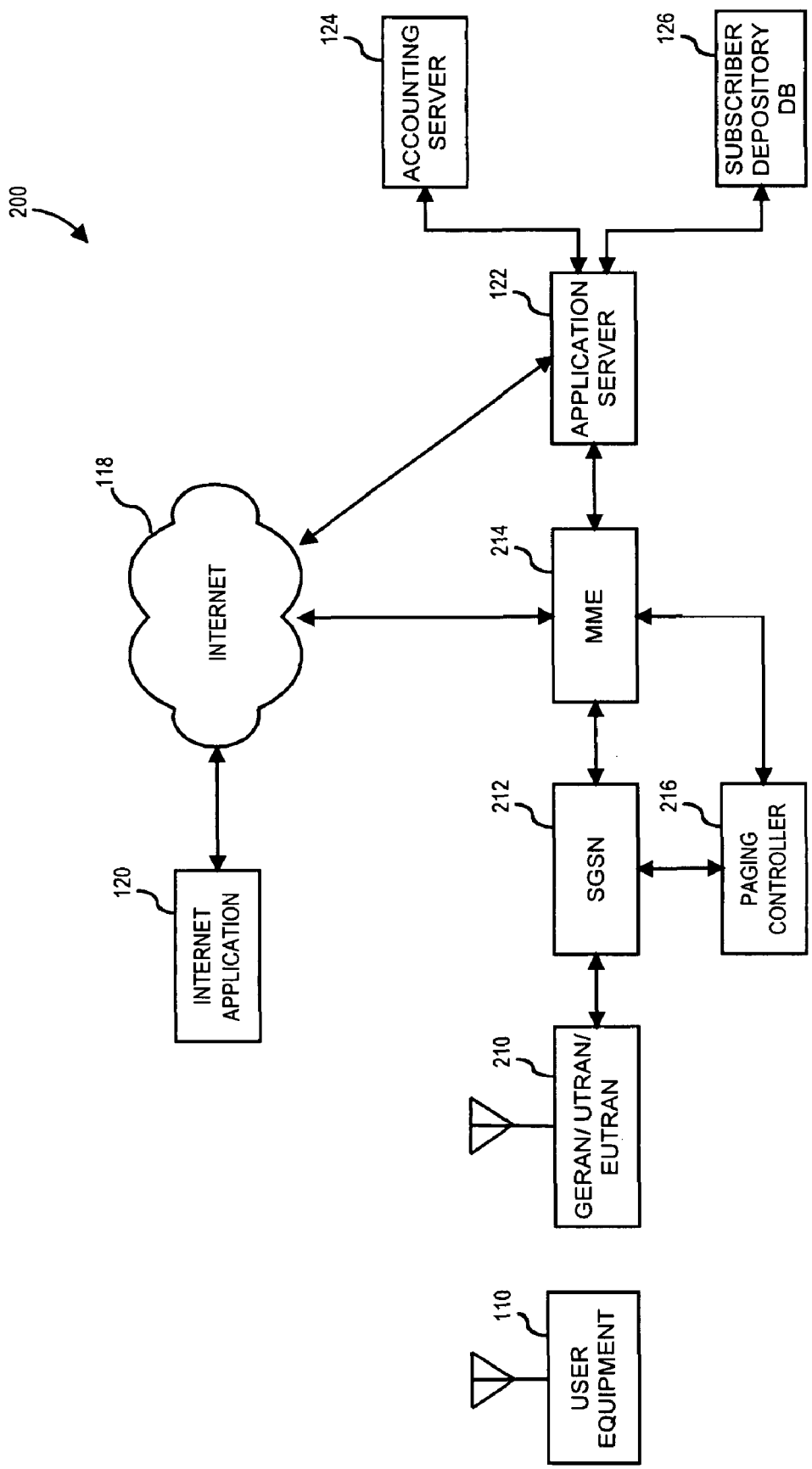
FIG. 2 is a diagram illustrating incorporation of an application server capable of keep-alive handling in a 3GPP-type network or the like in accordance with one or more embodiments.

Referring now to FIG. 2, a diagram illustrating incorporation of an application server capable of keep-alive handling in a Third Generation Partnership Project (3GPP)-type network or the like in accordance with one or more embodiments will be discussed. Network 200 of FIG. 2 may be substantially similar to network 100 of FIG. 1. Instead of a broadband wireless network 100 as shown in FIG. 1, however, network 200 may comprise a 3GPP-type network or the like, including but not limited to a 3GPP2-type network, a Long Term Evolution (LTE)-type network, a system architecture evolution (SAE)-type network, a Universal Mobile Telephone (UMTS)-type network, a Wideband Code Division Multiple Access (W-CDMA)-type network, and so on. The scope of the claimed subject matter is, however, not limited to any particular type of network. In one or more embodiments, network 200 may have one or more analogous network elements as network 100, for example, mobile station 110 of FIG. 1 may be analogous to user equipment 110 of FIG. 2, base station 112 of FIG. 1 may be analogous to Global System for Mobile Communications (GSM) Enhanced Data Rates for GSM Evolution (EDGE) Radio Access Network (RAN) referred to as GERAN, UMTS Terrestrial Radio Access Network (UTRAN), Enhanced UTRAN (EUTRAN) (GERAN-NTRANIEUTRAN) 210 of FIG. 2, ASN GW 114 of FIG. 1 may be analogous to Serving General Packet Radio Service (GPRS) Support Node (SGSN) 212 of FIG. 2, CSN 116 may be analogous to Mobility Management Entity (MME) 214, and/or paging controller 128 may be analogous to paging controller 216. In general, user equipment may be referred to herein as a mobile station. Thus, in one or more embodiments, application server 122 may function as a proxy to handle keep-alives on behalf of mobile station 110 in network 200 in a manner substantially similar to how application server may function as a proxy to handle keep-alives on behalf of mobile station 110 in network 200 by communicating with the network elements of network 200 in a manner substantially similar to communicating with the network elements of network 100, and/or in a manner consistent with a standard under which network 200 may be operating. This is, however, merely one example of the network elements of network 200, and the scope of the claimed subject matter is not limited in this respect. Control of how application server 122 tracks in network 200 when one or more mobile stations 110 are in an idle mode or a connected mode, and how keep-alives are handled by application server 122 when a mobile station 110 is in an idle mode, is discussed with respect to FIGS. 6, 7, and 8, below, and in one or more embodiments may be analogous to how such control may be implemented as shown in and described with respect to FIGS. 3, 4, and 5, below, although the scope of the claimed subject matter is not limited in these respects.

Figure 3:
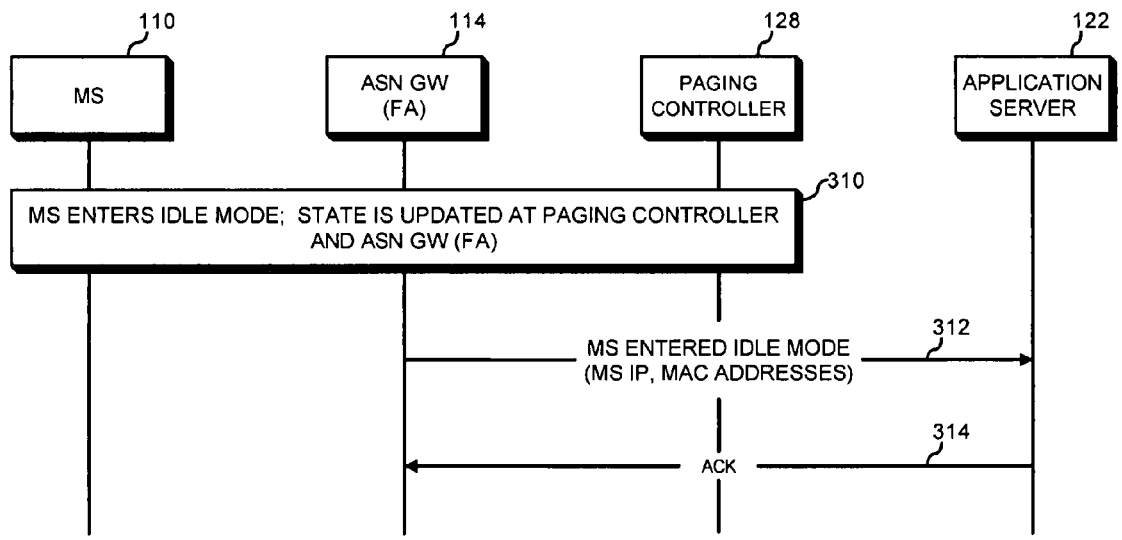
FIG. 3 is flow diagram of a process for a mobile station entering into an idle mode in a broadband wireless network in accordance with one or more embodiments.

Referring now to FIG. 3, a flow diagram of a process for a mobile station entering into an idle mode in a broadband wireless network in accordance with one or more embodiments will be discussed. As shown in FIG. 3, mobile station 110 may enter an idle mode from time to time, for example, to conserve power when operating from a battery. In one or more embodiments, for example, in a broadband wireless network, such as network 100 of FIG. 1, approximately 90% of the mobile stations 110 may be in an idle mode at a given time, although the scope of the claimed subject matter is not limited in this respect. Thus, at block 310, mobile station 110 may enter into an idle mode, and the state of mobile station 110 as being in an idle mode may be updated at paging controller 128 and/or ASN G W 114. At operation 312, ASN GW 114 may inform application server 122 that mobile station 110 has entered into an idle mode so that application server 112 may track which mobile stations 110 are in an idle mode and to know that application server 122 should act on behalf of mobile station 110 while mobile station is in idle mode if keep-alives are sent from Internet application 120 to mobile station 110. Furthermore, ASN GW 114 may provide application server 122 with the IP address and/or media access control (MAC) address of mobile station 110 at operation 312. In response to receiving a message at operation 312 from ASN GW 114 that mobile station 110 has entered into an idle mode, application server 122 may transmit an acknowledgment back to ASN GW 114 at operation 314 that the message was successfully received. The scope of the claimed subject matter is, however, not limited in this respect.

Figure 4:
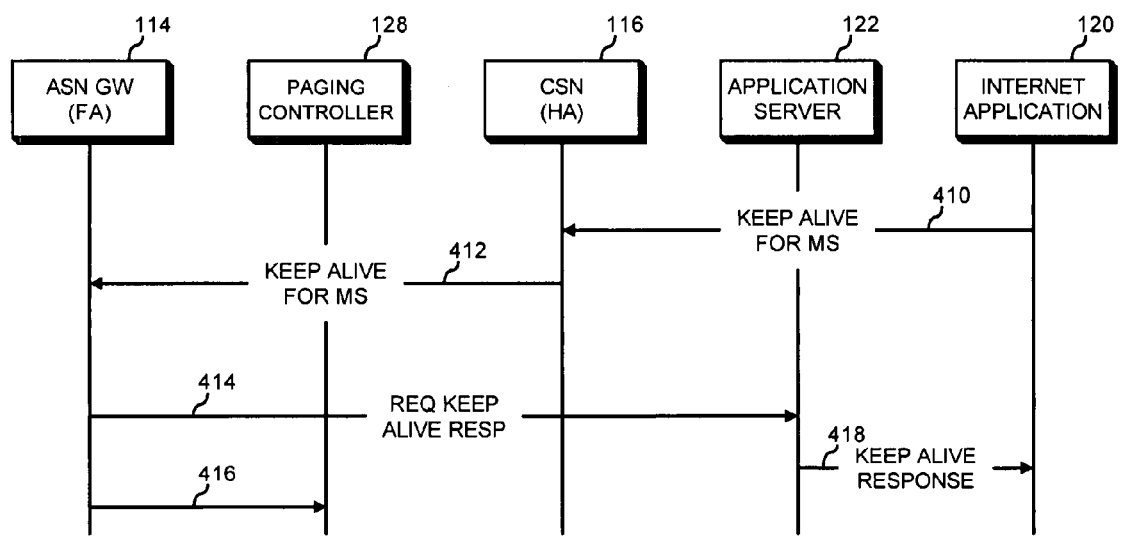
FIG. 4 is a flow diagram of a process for an application server responding to a keep-alive on behalf of a mobile station in a broadband wireless network in accordance with one or more embodiments.

Referring now to FIG. 4, a flow diagram of a process for an application server responding to a keep-alive on behalf of a mobile station in a broadband wireless network in accordance with one or more embodiments will be discussed. As shown in FIG. 4, the flow events in which application server 122 responds to a keep-alive from Internet application 120 may be as follows. Internet application 120 may transmit a keep-alive packet to CSN 116, acting as a home agent (HA), for mobile station 110 at operation 410. CSN 116 may then forward the keep-alive packet to ASN GW 114, acting as a foreign agent (FA), at operation 412. ASN GW 114 may look up the associated port number in the Universal Datagram Protocol/Internet Protocol (UDP/IP) and/or Transmission Control Protocol/Internet Protocol (TCP/IP) header of the keep-alive packet. In one or more embodiments, ASN GW 114 may have a preconfigured list of known ports that may be associated with the ports of known applications that utilize keep-alives or the like. If the port number on the keep-alive packet matches a port number on the list, then ASN GW 114 may forward the keep-alive packet to application server 122 at operation 414, which may be a request of application server 122 to provide a keep-alive response to the keep-alive packet received from Internet application 120. In one or more embodiments, if there is no match of known applications for the port number in the keep-alive packet, ASN GW 114 may alternatively send the keep-alive packet at operation 416 to paging controller 128 to page mobile station 110 to awaken from idle mode so that mobile station 110 may directly respond to the keep-alive packet.

In the event in which a port match was found and a keep-alive request was forwarded to application server 122 for handling, application server 122 may send a response to the keep-alive packet to Internet application 120 at operation 418 on behalf of mobile station 110 without requiring mobile station 110 to be paged or otherwise awoken from idle state. In one or more embodiments, application server 122 may have the proper formats for responses to keep-alive packets for one or more Internet application 120. Based on such stored formats, application server 122 may be capable of constructing a keep-alive response on behalf of mobile station 110 for the particular Internet application 120 that sent the keep-alive packet so that a proper keep-alive response may be received by Internet application 120. Application server 110 may use the IP address and/or MAC address of mobile station 110 in the keep alive response that application server received at operation 312 of FIG. 3 so that the keep-alive response received by Internet application 120 appears from the perspective of Internet application 120 to have been sent by mobile station 110. This is, however, merely one example of how application server 122 may responds to keep-alives on behalf of one or more mobile stations 110, and the scope of the claimed subject matter is not limited in this respect. For example, alternatively, application server 110 may transmit to Internet application 120 that application server 122 is acting as a proxy on behalf of mobile station 110 while mobile station 110 in idle mode, however, the scope of the claimed subject matter is not limited in this respect.

Figure 5:
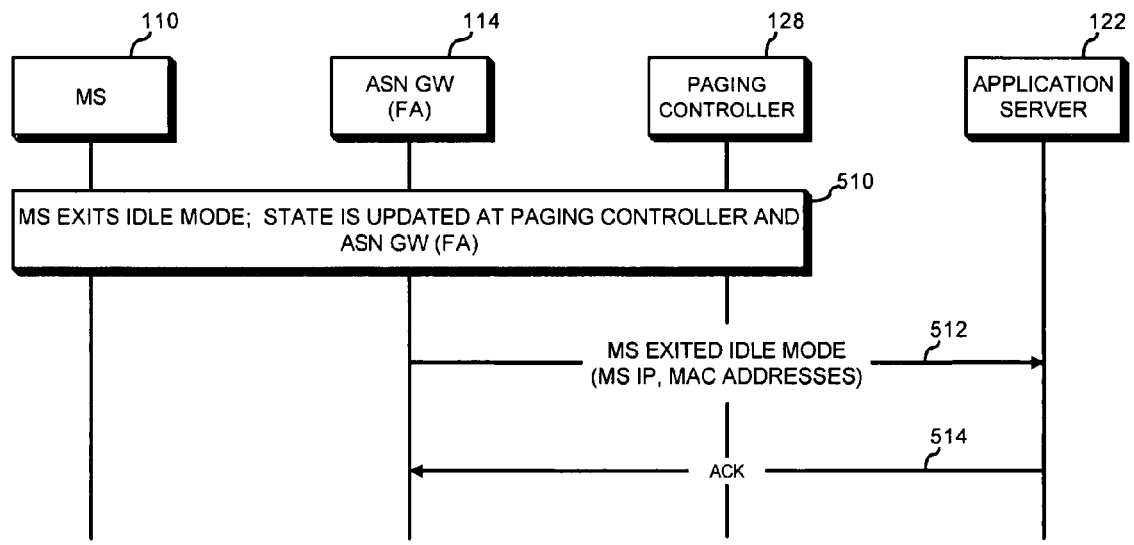
FIG. 5 is a flow diagram of a process for a mobile station exiting an idle mode in a broadband wireless network in accordance with one or more embodiments.

Referring now to FIG. 5, a flow diagram of a process for a mobile station exiting an idle mode in a broadband wireless network in accordance with one or more embodiments will be discussed. As shown in FIG. 5, mobile station 110 may exit and idle mode, for example to switch to a connected mode, at block 510. In the event mobile station exits idle mode, the state of mobile station 110 exiting idle mode may be updated at paging controller 128, and/or at ASN GW 114. In response to mobile station 110 exiting idle mode, ASN GW 114 may transmit a message to application server 122 at operation 512 that mobile station 110 has exited idle mode, and may further transmit that IP address and/or MAC address of that particular mobile station 110. Thus, application server 122 may know that mobile station 110 is no longer in idle mode and may be in a connected mode in which case application server 122 knows that mobile station 110 is capable of directly responding to keep-alive packets from Internet application 120 and that application server 122 need not reply to any such keep-alive packets on behalf of mobile station 110. In response to receiving such a message at operation 512, application server 122 may send an acknowledgment at operation 514 to ASN GW 114 that the message has been received. In one or more embodiments, while mobile station 110 is not in a connected mode, ASN GW 114 will not forward keep-alive packets received from Internet application 120 to application server 122, and may instead forward such keep-alive packets to mobile station 110 so that mobile station 110 may provide a proper keep-alive response to Internet application 120. The scope of the claimed subject matter is, however, not limited in this respect.

Figure 6:
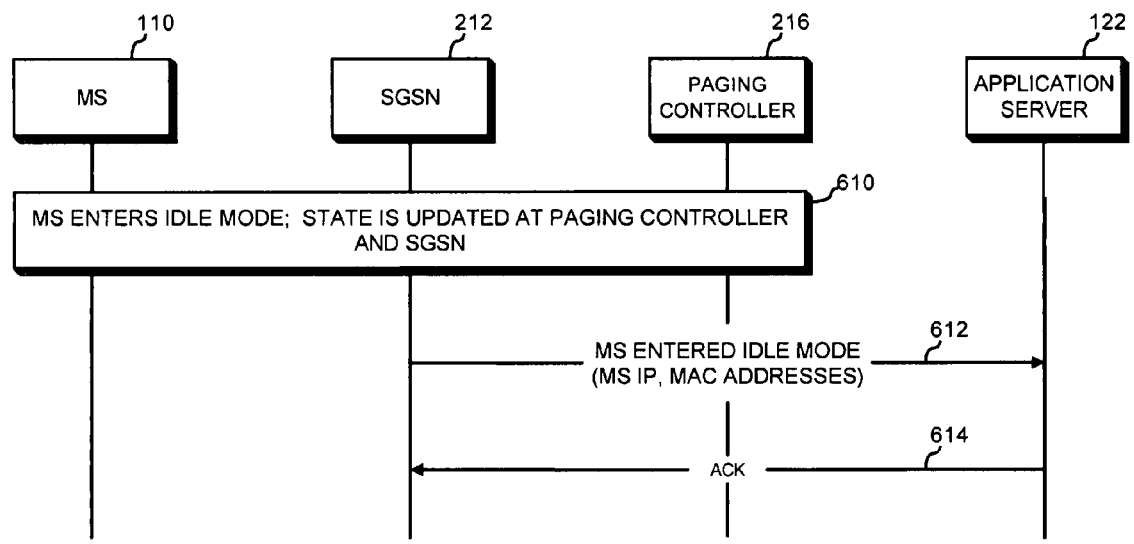
FIG. 6 is flow diagram of a process for a mobile station entering into an idle mode in a 3GPP-type network in accordance with one or more embodiments.

Referring now to FIG. 6, a flow diagram of a process for a mobile station entering into an idle mode in a 3GPP-type network in accordance with one or more embodiments will be discussed. In a manner substantially similar to the process shown in and described with respect to FIG. 3 for network 100, as shown in FIG. 6 for network 200, mobile station 110 may enter an idle mode from time to time, for example, to conserve power when operating from a battery. In one or more embodiments, for example in a 3GPP-type network, such as network 200 of FIG. 2, approximately 90% of the mobile stations 110 may be in an idle mode at a given time, although the scope of the claimed subject matter is not limited in this respect. Thus, at block 610, mobile station 110 may enter into an idle mode, and the state of mobile station 110 as being in an idle mode may be updated at paging controller 216 and/or SGSN 212. At operation 612, SGSN 212 may inform application server 122 that mobile station 110 has entered into an idle mode so that application server 122 may track which mobile stations 110 are in an idle mode and to know that application server 122 should act on behalf of mobile station 110 while mobile station is in idle mode if keep-alives are sent from Internet application 120 to mobile station 110. Furthermore, SGSN 212 may provide application server 122 with the IP address and/or media access control (MAC) address of mobile station 110 at operation 612. In response to receiving a message at operation 612 from SGSN 212 that mobile station 110 has entered into an idle mode, application server 122 may transmit an acknowledgment back to SGSN 212 at operation 614 that the message was successfully received. The scope of the claimed subject matter is, however, not limited in this respect.

Figure 7:
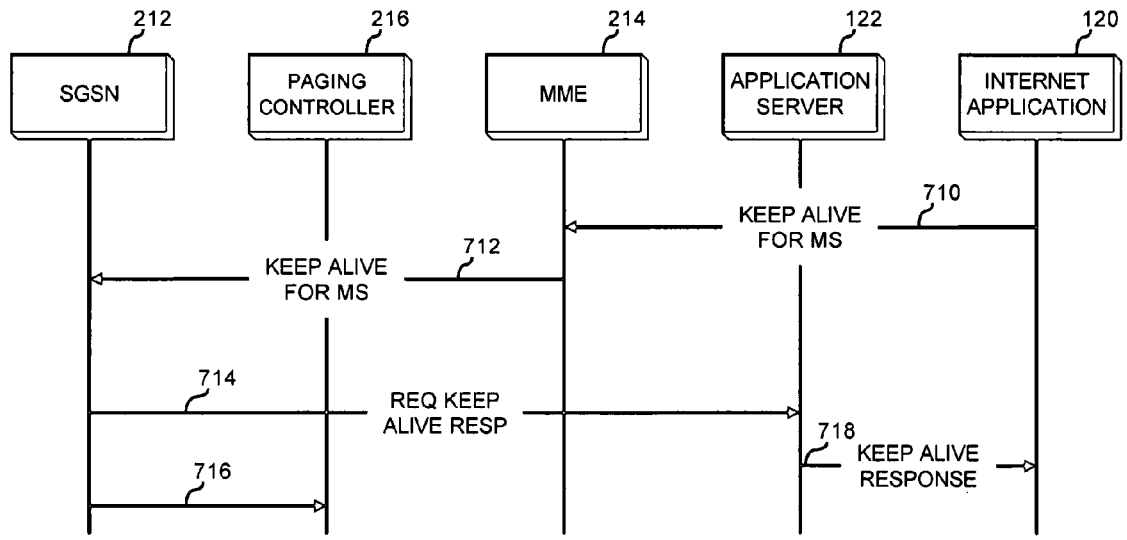
FIG. 7 is a flow diagram of a process for an application server responding to a keep-alive on behalf of a mobile station in a 3GPP-type network in accordance with one or more embodiments.

Referring now to FIG. 7, a flow diagram of a process for an application server responding to a keep-alive on behalf of a mobile station in a 3GPP-type network in accordance with one or more embodiments will be discussed. In a manner substantially similar to the process shown in and described with respect to FIG. 4 for network 100, as shown in FIG. 7 for network 200, the flow events in which application server 122 responds to a keep-alive from Internet application 120 may be as follows. Internet application 120 may transmit a keep-alive packet to MME 214, acting as a home agent (HA), for mobile station 110 at operation 710. MME 214 may then forward the keep-alive packet to SGSN 212, acting as a foreign agent (FA), at operation 712. SGSN 212 may look up the associated port number in the UDP/IP and/or TCP/IP header of the keep-alive packet. In one or more embodiments, SGSN 212 may have a pre-configured list of known ports that may be associated with the ports of known applications that utilize keep-alives or the like. If the port number on the keep-alive packet matches a port number on the list, then SGSN 212 may forward the keep-alive packet to application server 122 at operation 714, which may be a request of application server 122 to provide a keep-alive response to the keep-alive packet received from Internet application 120. In one or more embodiments, if there is no match of known applications for the port number in the keep-alive packet, SGSN 212 may alternatively send the keep-alive packet at operation 716 to paging controller 216 to page mobile station 110 to awaken from idle mode so that mobile station 110 may directly respond to the keep-alive packet.

In the event in which a port match was found and a keep-alive request was forwarded to application server 122 for handling, application server 122 may send a response to the keep-alive packet to Internet application 120 at operation 718 on behalf of mobile station 110 without requiring mobile station 110 to be paged or otherwise awoken from idle state. In one or more embodiments, application server 122 may have the proper formats for responses to keep-alive packets for one or more Internet application 120. Based on such stored formats, application server 122 may be capable of constructing a keep-alive response on behalf of mobile station 110 for the particular Internet application 120 that sent the keep-alive packet so that a proper keep-alive response may be received by Internet application 120. Application server 110 may use the IP address and/or MAC address of mobile station 110 in the keep alive response that application server received at operation 712 of FIG. 3 so that the keep-alive response received by Internet application 120 appears from the perspective of Internet application 120 to have been sent by mobile station 110. This is, however, merely one example of how application server 122 may responds to keep-alives on behalf of one or more mobile stations 110, and the scope of the claimed subject matter is not limited in this respect. For example, alternatively, application server 110 may transmit to Internet application 120 that application server 122 is acting as a proxy on behalf of mobile station 110 while mobile station 110 in idle mode, however the scope of the claimed subject matter is not limited in this respect.

Figure 8:
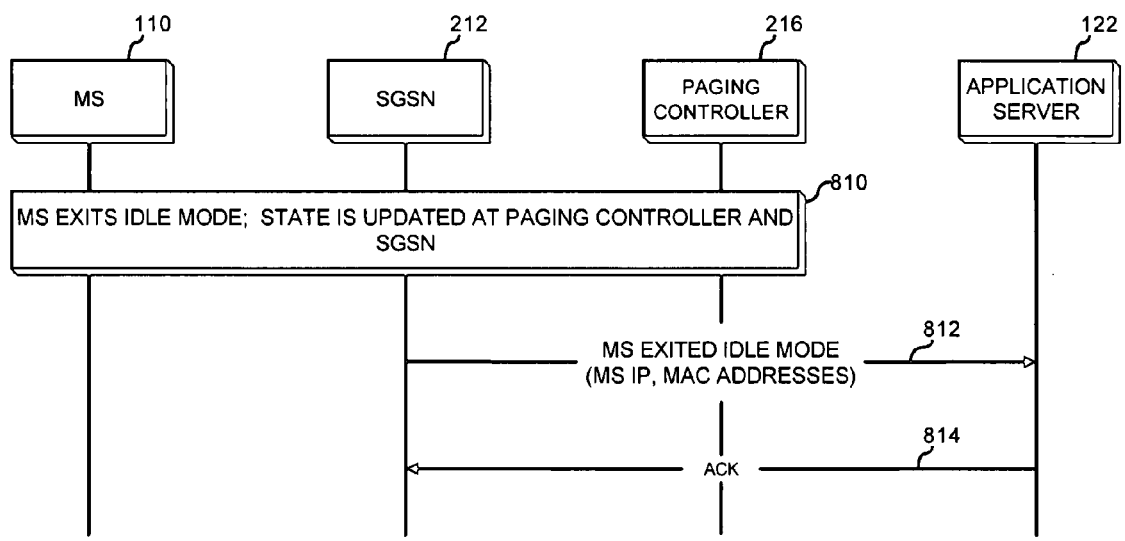
FIG. 8 is a flow diagram of a process for a mobile station exiting an idle mode in a 3GPP-type network in accordance with one or more embodiments.

Referring now to FIG. 8, a flow diagram of a process for a mobile station exiting an idle mode in a 3GPP-type network in accordance with one or more embodiments will be discussed. In a manner substantially similar to the process shown in and described with respect to FIG. 5 for network 100, as shown in FIG. 8 for network 200, mobile station 110 may exit and idle mode, for example, to switch to a connected mode, at block 810. In the event mobile station 110 exits idle mode, the state of mobile station 110 exiting idle mode may be updated at paging controller 216, and/or at SGSN 212. In response to mobile station 110 exiting idle mode, SGSN 212 may transmit a message to application server 122 at operation 812 that mobile station 110 has exited idle mode, and may further transmit the IP address and/or MAC address of that particular mobile station 110. Thus, application server 122 may know that mobile station 110 is no longer in idle mode and may be in a connected mode in which case application server 122 knows that mobile station 110 is capable of directly responding to keep-alive packets from Internet application 120 and that application server 122 need not reply to any such keep-alive packets on behalf of mobile station 110 when mobile station 110 is in a connected mode. In response to receiving such a message at operation 712, application server 122 may send an acknowledgment at operation 814 to SGSN 212 that the message has been received. In one or more embodiments, while mobile station 110 is not in a connected mode, SGSN 212 will not forward keep-alive packets received from Internet application 120 to application server 122, and may instead forward such keep-alive packets to mobile station 110 so that mobile station 110 may provide a proper keep-alive response to Internet application 120. The scope of the claimed subject matter is, however, not limited in this respect.

Figure 9:
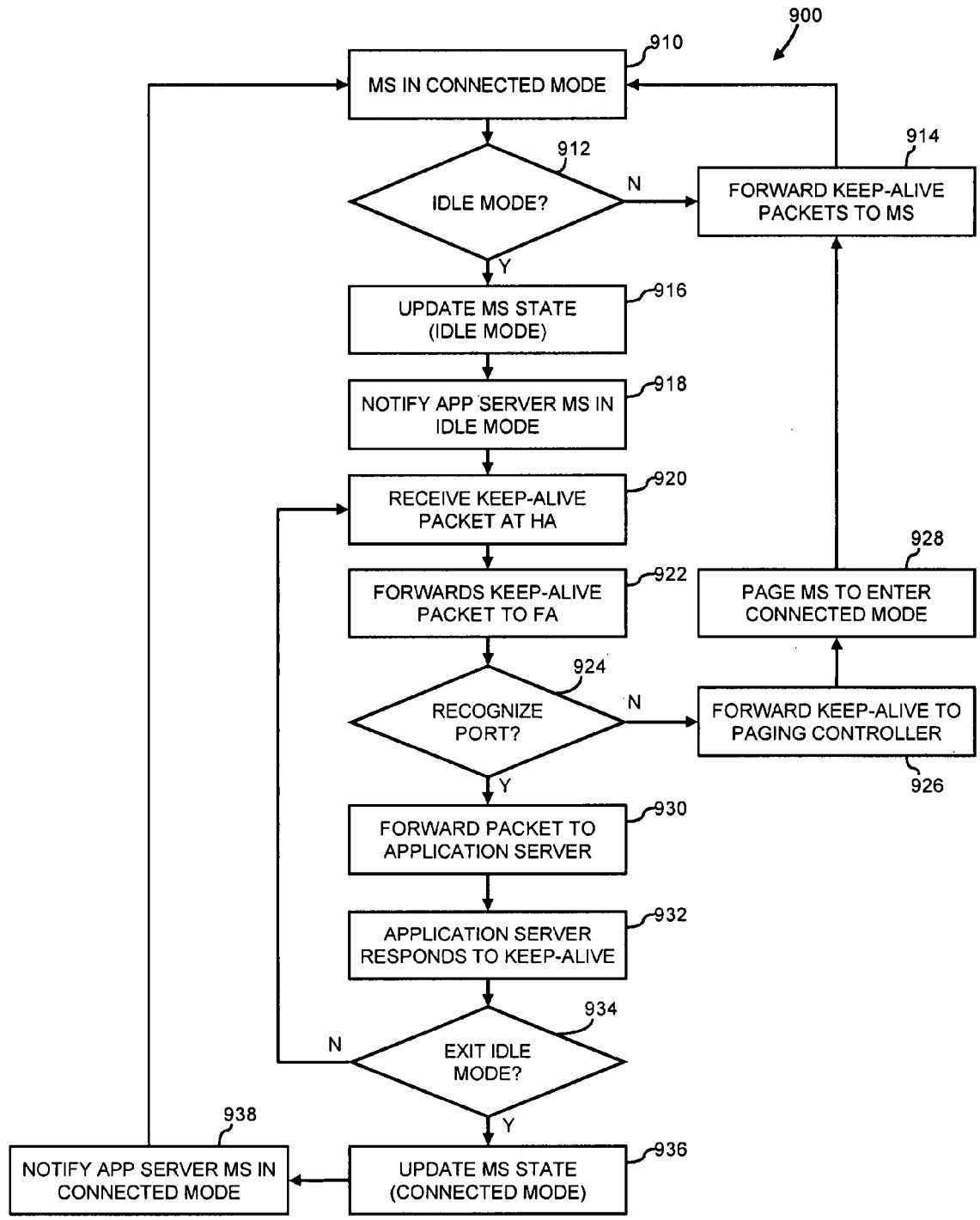
FIG. 9 is a flow diagram of an overall process for handling keep-alives in a wireless network in accordance with one or more embodiments.

Referring now to FIG. 9, a flow diagram of an overall process for handling keep-alives in a wireless network in accordance with one or more embodiments will be discussed. One particular order of the blocks of method 900 is shown in FIG. 9, however, in other embodiments the blocks may be arranged in one or more other orders, and/or may include more or fewer blocks than shown in FIG. 9. Furthermore, method 900 may be tangibly embodied in a computer program and/or application or the like executed by a computing platform or other information handling system, such as shown in and described with respect to FIG. 10, below, and the scope of the claimed subject matter is not limited in these respects.

In one or more embodiments of method 900, mobile station 110 may be in a connected mode at block 910. A determination may be made at decision block 912 whether mobile station 110 has entered into an idle mode. In the event mobile station 110 is not in an idle mode, for example, if mobile station 110 is in a connected mode, keep-alive packets that are received from Internet application 120 maybe be forwarded at block 914 to mobile station 110 for handling by mobile station 110, for example, mobile station 110 may send a keep-alive response back to Internet application 120. In the event mobile station 110 is in an idle mode, for example, in which mobile station 110 transitions from a connected mode to an idle mode, the state of mobile station 110 as being in an idle mode may be updated at block 916, for example, as shown in and described with respect to FIG. 3 and/or FIG. 6. Application server 122 may be notified at block 918 that mobile station 110 is now in an idle mode. One or more keep-alive packets may be received at block 920 by a network element that is functioning as a home agent. Optionally, if mobile station 110 is in communication with a network element that is acting as a foreign agent, the home agent may forward the keep-alive packet to the foreign agent at block 922. In one or more alternative embodiments, if mobile station 110 is communicating on its home network, the home agent may optionally forward the packet to a network element in communication with a home base station 110 within a home access service network of mobile station 110, although the scope of the claimed subject matter is not limited in this respect.

In any event, the foreign agent and/or other network element may determine at decision block 924 whether a port in the keep-alive packet is recognized and/or associated with a known Internet application 120. In the event the port is not recognized, the keep-alive packet may be forwarded at block 926 to a paging controller, such as paging controller 128 and/or paging controller 216. In such an arrangement, the paging controller may page mobile station 110 to exit idle mode and/or otherwise enter into a connected mode at block 928, and the paging controller may forward the keep-alive packet to mobile station 110 at block 914 for handling of the keep-alive packet and/or to provide a keep-alive response to Internet application 120, although the scope of the claimed subject matter is not limited in this respect.

In the event the port is recognized at decision block 924, the keep-alive packet may be forwarded to application server 122 at block 930, and application server 122 may then respond at block 932 to the keep-alive packet on behalf of mobile station 110, for example, by sending a keep-alive response to Internet application 120. A determination may be made at decision block 934 whether mobile station 110 has exited idle mode. In the event mobile station 110 has not exited idle mode and remains in idle mode, method 900 may continue at block 920, wherein further keep-alive packets may be received from Internet application 120 and handled accordingly. In one or more embodiments, in the event mobile station 110 has exited idle mode, the state of mobile station 110 may be updated as being in connected mode at block 936, and application server 122 may be notified at block 938 that mobile station 110 is not in idle mode and/or is in connected mode. Method 900 may then continue at block 910 wherein further keep-alive packets may be received from Internet application 120 and handled accordingly. Although method 900 shows one or more embodiments of a process for handling keep-alives in a wireless network by a proxy application server, one or more alternative embodiments may likewise be implemented, for example, according to the particular network elements, protocols, and/or standards of the particular network in which process 900 may be implemented, and the scope of the claimed subject matter is not limited in this respect.

Figure 10:
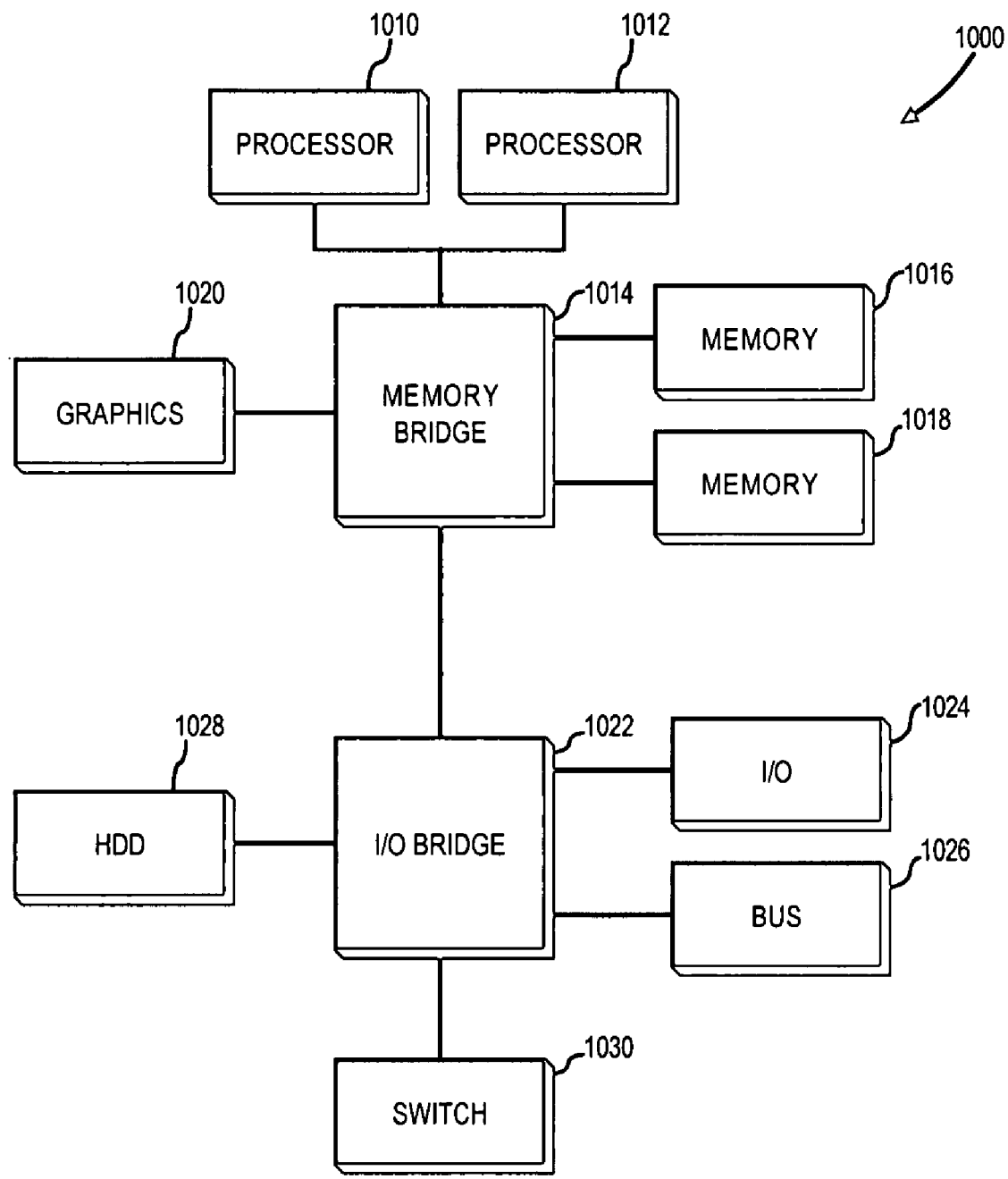
FIG. 10 is a block diagram of an information handling system capable of handling keep-alives in a wireless network in accordance with one or more embodiments.

Referring now to FIG. 10, a block diagram of an information handling system capable of handling keep-alives in a wireless network in accordance with one or more embodiments will be discussed. Information handling system 1000 of FIG. 10 may tangibly embody one or more of any of the network elements of network 100 and/or network 200 as show in and described with respect to FIG. 1 and/or FIG. 2. Furthermore, such and information handling system 1000 may be arranged to implement the flow diagrams of FIG. 4, FIG. 5, FIG. 6, FIG. 7, FIG. 8, and/or FIG. 9, for example, as instructions that may be stored on a storage medium and that are capable of being executed by information handling system 1000 and/or a similar type of computing platform. Although information handling system 1000 represents one example of several types of computing platforms, information handling system 1000 may include more or fewer elements and/or different arrangements of elements than shown in FIG. 10, and the scope of the claimed subject matter is not limited in these respects.

Information handling system 1000 may comprise one or more processors, such as processor 1010 and/or processor 1012, which may comprise one or more processing cores. One or more of processor 1010 and/or processor 1012 may couple to one or more memories 1016 and/or 1018 via memory bridge 1014, which may be disposed external to processors 1010 and/or 1012, or alternatively at least partially disposed within one or more of processors 1010 and/or 1012.

Memory 1016 and/or memory 1018 may comprise various types of semiconductor-based memory, for example, volatile-type memory and/or non-volatile-type memory. Memory bridge 1014 may couple to a graphics system 1020 to drive a display device (not shown) coupled to information handling system 1000.

Information handling system 1000 may further comprise input/output (I/O) bridge 1022 to couple to various types of I/O systems. I/O system 1024 may comprise, for example, a universal serial bus (USB) type system, an IEEE 1394-type system, or the like, to couple one or more peripheral devices to information handling system 1000. Bus system 1026 may comprise one or more bus systems, such as a peripheral component interconnect (PCI) express-type bus or the like, to connect one or more peripheral devices to information handling system 1000. A hard disk drive (HDD) controller system 1028 may couple one or more hard disk drives or the like to information handling system, for example Serial ATA-type drives or the like. Switch 1030 may be utilized to couple one or more switched devices to I/O bridge 1022, for example, Gigabit Ethernet-type devices or the like.

Although the claimed subject matter has been described with a certain degree of particularity, it should be recognized that elements thereof may be altered by persons skilled in the art without departing from the spirit and/or scope of claimed subject matter. It is believed that the subject matter pertaining to keep-alive handling in a wireless network and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   receiving a packet at an application server from a remote application for a mobile station, the application server acting as a proxy for the mobile station, and the received packet comprising a keep-alive packet;
   determining at the application server if the mobile station is in an idle mode, the mobile station not actively communicating with a base station when the mobile station is in the idle mode;
   if the remote station is in the idle mode, determining at the application server whether a port in the packet is recognized; and
   if the port is recognized, responding to the packet by the application server on behalf of the mobile station.

2. A method as claimed in claim 1, further comprising, if the port in the packet is not recognized, paging the mobile station by the application server and forwarding the packet by the application server to the mobile station for handling of the packet by the mobile station.

3. A method as claimed in claim 1, wherein responding to the packet comprises providing a response to the packet by the application server to the remote application so that the response appears to have come from the mobile station.

4. A method as claimed in claim 1, wherein responding to the packet comprises providing a response to the packet by the application server to the remote application so that the response appears to have come from the mobile station by including an Internet Protocol address of the mobile station, or the media access control address of the mobile station, or combinations thereof.

5. A method as claimed in claim 1, wherein responding to the packet comprises providing a response to the packet by the application server to the remote application so that the response appears to have come from the mobile station by providing the response in accordance with a client application to the remote application.

6. A method as claimed in claim 1, further comprising, if the mobile station is not in the idle mode, forwarding the packet by the application server to the mobile station for handling of the packet by the mobile station.

7. A method as claimed in claim 1, if the mobile station is in the idle mode, updating a status of the mobile station as in the idle mode, and storing an Internet Protocol address of the mobile station, or the media access control address of the mobile station, or combinations thereof, for handling responses to packets received from the mobile station.

8. An article of manufacture comprising a non-transitory storage medium having machine-readable instructions stored thereon that, if executed, result in the handling of packets received from a remote application, by:
   receiving a packet at an application server from a remote application for a mobile station, the application server acting as a proxy for the mobile station, and the received packet comprising a keep-alive packet;
   determining at the application server if the mobile station is in an idle mode, the mobile station not actively communicating with a base station when the mobile station is in the idle mode;
   if the remote station is in the idle mode, determining at the application server whether a port in the packet is recognized; and
   if the port is recognized, responding to the packet by the application server on behalf of the mobile station.

9. An article of manufacture as claimed in claim 8, wherein the instructions, if executed, further result in the handling of packets received from a remote application, by:
   if the port in the packet is not recognized, paging the mobile station by the application server and forwarding the packet by the application server to the mobile station for handling of the packet by the mobile station.

10. An article of manufacture as claimed in claim 8, wherein responding to the packet comprises providing a response to the packet by the application server to the remote application so that the response appears to have come from the mobile station.

11. An article of manufacture as claimed in claim 8, wherein responding to the packet comprises providing a response to the packet by the application server to the remote application so that the response appears to have come from the mobile station by including an Internet Protocol address of the mobile station, or the media access control address of the mobile station, or combinations thereof.

12. An article of manufacture as claimed in claim 8, wherein responding to the packet comprises providing a response to the packet by the application server to the remote application so that the response appears to have come from the mobile station by providing the response in accordance with a client application to the remote application.

13. An article of manufacture as claimed in claim 8, wherein the instructions, if executed, further result in the handling of packets received from a remote application, by:
   if the mobile station is not in the idle mode, forwarding the packet by the application server to the mobile station for handling of the packet by the mobile station.

14. An article of manufacture as claimed in claim 8, wherein the instructions, if executed, further result in the handling of packets received from a remote application, by:
- if the mobile station is in the idle mode, updating a status of the mobile station as in the idle mode; and
- storing an Internet Protocol address of the mobile station, or the media access control address of the mobile station, or combinations thereof, for handling responses to packets received from the mobile station.

15. An apparatus, comprising:
- a home agent capable of receiving packets for a mobile station from a remote application; and
- an application server coupled to said home agent, said application server being capable of determining whether the mobile station is in an idle mode and responding to the packets on behalf of the mobile station if the mobile station is in the idle mode, the application server acting as a proxy for the mobile station, and the mobile station not actively communicating with a base station when the mobile station is in the idle mode, and the received packets comprising keep-alive packets.

16. An apparatus as claimed in claimed in claim 15, further comprising a foreign agent capable of receiving the packets from said home agent if the mobile station is not within range of a home network of the mobile station, said foreign agent being further capable of forwarding the packets to said application server for handling by said application server if said foreign agent recognizes a port in the packets.

17. An apparatus as claimed in claimed in claim 15, further comprising a foreign agent capable of receiving the packets from the home agent if the mobile station is not within range of a home network of the mobile station, and a paging controller, said foreign agent being further capable of forwarding the packets to said paging controller for paging of the mobile station and handling of the packets by the mobile station if the foreign agent does not recognize a port in the packets.

18. An apparatus as claimed in claim 15, said home agent being further capable of forwarding the packets to said application server for handling by the application server if said home agent recognizes a port in the packets.

19. An apparatus as claimed in claim 15, further comprising a paging controller, said home agent being further capable of forwarding the packets to said paging controller for paging of the mobile station and handling of the packets by the mobile station if said home agent does not recognize a port in the packets.

20. An apparatus as claimed in claim 15, said home agent comprising one of a connectivity service network, or a packet data serving node, or combinations thereof.

21. An apparatus as claimed in claim 16, said foreign agent comprising an access service network gateway or a mobility management entity, or combinations thereof.

22. An application server, comprising:
- a processor;
- a storage device coupled to said processor;
- and a fiber optic network adapter capable of communicating with said processor and coupling the application server to one or more other network elements in a network;
- said storage device having data stored thereon pertaining to a mobile station proximate to the network;
- said processor being capable of executing instructions that, if executed, result in the application server determining whether the mobile station is in an idle mode and providing a response to keep-alive packets sent from a remote application to the mobile station, the response being provided by the application server on behalf of the mobile station if the mobile station is in an idle mode, and the mobile station not actively communicating with a base station when the mobile station is in the idle mode.

23. An application server as claimed in claim 22, said storage device comprising a semiconductor-type memory, a polymer-type memory, a phase-change-type memory, or a disk drive-type memory, or combinations thereof.

24. An application server as claimed in claim 22, said storage device having stored thereon one or more formats for a keep-alive response to the keep-alive packets sent from the remote application for one or more applications.

25. An application server as claimed in claim 22, said storage device having stored thereon an Internet Protocol address of a mobile station, or a media access control address of the mobile station, or combinations thereof.

26. An application server as claimed in claim 22, said storage device having stored thereon a state of the mobile station as being in the idle mode or not in the idle mode.

27. An application server as claimed in claim 22, said processor being capable of executing instructions that, if executed, result in the application server providing an acknowledgment in response to receiving an update in a state of the mobile station, and updating the information pertaining to the mobile station stored on said storage device with the state of the mobile station.

28. An application server as claimed in claim 22, said processor being capable of executing instructions that, if executed, result in the application server constructing a keep-alive response to the remote application on behalf of the mobile station, the constructed response including an Internet Protocol address of a mobile station, or a media access control address of the mobile station, or combinations thereof, to appear to the remote application as if the mobile station provide the keep-alive response.

* * * * *